United States Patent
Spagna et al.

(10) Patent No.: US 12,094,103 B2
(45) Date of Patent: Sep. 17, 2024

(54) CONTROL SYSTEM FOR THE QUALITY OF PROCESSING PIPES MADE OF THERMOPLASTIC MATERIAL

(71) Applicant: SICA S.P.A., Alfonsine (IT)

(72) Inventors: Lorenzo Spagna, Guastalla (IT); Davide Rizzo, Lugo (IT); Marco Secchiari, Alfonsine (IT)

(73) Assignee: SICA S.P.A., Alfonsine (IT)

( * ) Notice: Subject to any disclaimer, the term of this patent is extended or adjusted under 35 U.S.C. 154(b) by 110 days.

(21) Appl. No.: 17/609,310

(22) PCT Filed: May 14, 2020

(86) PCT No.: PCT/IB2020/054573
§ 371 (c)(1),
(2) Date: Nov. 5, 2021

(87) PCT Pub. No.: WO2020/230075
PCT Pub. Date: Nov. 19, 2020

(65) Prior Publication Data
US 2022/0222801 A1    Jul. 14, 2022

(30) Foreign Application Priority Data
May 16, 2019    (IT) .................... 102019000006925

(51) Int. Cl.
*G01B 11/10* (2006.01)
*G01B 11/30* (2006.01)
*G06T 7/00* (2017.01)

(52) U.S. Cl.
CPC ............ *G06T 7/001* (2013.01); *G01B 11/105* (2013.01); *G01B 11/303* (2013.01); *G06T 2207/30108* (2013.01)

(58) Field of Classification Search
CPC ............... G01N 21/892; G01N 21/952; G01N 21/8806; G01N 2021/8816;
(Continued)

(56) References Cited

U.S. PATENT DOCUMENTS

| 4,914,289 A * | 4/1990 | Nguyen ............. G01N 21/8806 250/223 B |
| 5,012,117 A | 4/1991 | Karafa et al. |

(Continued)

FOREIGN PATENT DOCUMENTS

| CN | 109342455 A | 2/2019 |
| EP | 3315951 A1 | 5/2018 |

(Continued)

OTHER PUBLICATIONS

International Search Report and Written Opinion dated Aug. 13, 2020 from counterpart International Patent Application No. PCT/IB2020/054573.

*Primary Examiner* — Isiaka O Akanbi
(74) *Attorney, Agent, or Firm* — SHUTTLEWORTH & INGERSOLL, P.L.C.; Timothy J. Klima

(57) ABSTRACT

Described is a control system for the quality of processing pipes made of thermoplastic material, comprising a station for housing at least one pipe to be controlled, a first video camera configured to capture images of a first front scene showing a first longitudinal end of the pipe, and at least a second video camera configured to capture images of a second lateral scene showing the same said pipe in its longitudinal extension.

7 Claims, 2 Drawing Sheets

(58) Field of Classification Search
CPC .... G01N 2021/8918; G01N 2021/8924; G06T 7/001; G06T 2207/30108; G06T 2207/10024; G06T 7/0004; G01B 11/105; G01B 11/303
USPC .............. 356/237.2–237.6; 382/141, 142
See application file for complete search history.

(56) References Cited

U.S. PATENT DOCUMENTS

| | | | | |
|---|---|---|---|---|
| 6,104,482 | A * | 8/2000 | Brower | G01N 21/9054 356/240.1 |
| 6,226,081 | B1 * | 5/2001 | Fantone | G01F 23/804 356/239.6 |
| 6,519,356 | B1 * | 2/2003 | Hooker | G01N 21/9054 209/524 |
| 10,458,779 | B2 * | 10/2019 | Haitjema | G01B 11/255 |
| 11,549,803 | B2 * | 1/2023 | Cosneau | G06T 7/0002 |
| 2006/0000968 | A1 * | 1/2006 | Katayama | G01N 21/9054 250/223 B |
| 2008/0105067 | A1 * | 5/2008 | Frey | G01S 17/48 73/865.8 |
| 2011/0235057 | A1 * | 9/2011 | Storksen | G01B 11/12 356/630 |
| 2012/0216689 | A1 * | 8/2012 | Cochran | B41F 33/02 101/39 |
| 2013/0258046 | A1 * | 10/2013 | Nygaard | B07C 5/342 348/36 |
| 2014/0268123 | A1 * | 9/2014 | Juvinall | G01N 21/90 356/239.4 |
| 2015/0229887 | A1 * | 8/2015 | Kisner | H04N 23/56 348/84 |
| 2017/0122878 | A1 * | 5/2017 | Ono | G01N 21/952 |
| 2020/0300619 | A1 * | 9/2020 | Cosneau | G06T 7/62 |
| 2022/0196567 | A1 * | 6/2022 | Colle | G01N 21/9054 |

FOREIGN PATENT DOCUMENTS

| | | |
|---|---|---|
| WO | 2011074261 A1 | 6/2011 |
| WO | 2018221653 A1 | 12/2018 |

* cited by examiner

CONTROL SYSTEM FOR THE QUALITY OF PROCESSING PIPES MADE OF THERMOPLASTIC MATERIAL

This application is the National Phase of International Application PCT/IB2020/054573 filed May 14, 2020 which designated the U.S.

This application claims priority to Italian Patent Application No. 102019000006925 filed May 16, 2019, which application is incorporated by reference herein.

TECHNICAL FIELD

This invention relates to a control system for the quality of processing pipes made of thermoplastic material.

In particular, the invention relates to a system for controlling the quality of the processing of pipes made of thermoplastic material subjected to a belling step.

The invention also relates to a method for controlling the quality of processing of pipes made of thermoplastic material.

BACKGROUND ART

In the production of pipes made of thermoplastic material designed for making pipes for delivering and/or discharging fluids (used, for example, in building works, drainage networks, drinking water distribution networks and sewerage networks) belling machines are used for shaping an end portion of the pipes into the characteristic "bell" shape, which has a wider shape relative to the normal diameter of the pipe (the so-called "bell and spigot") and serves to connect together in succession the pipes which form the conduit. An unshaped end of a pipe is inserted in the bell-shaped end of the pipe upstream or downstream in the conduit.

Belling machines, which are generally automatic, are usually installed in an extruding line and, in-line, receive the pipes, or the pieces of cut pipes, to be processed.

The majority of belling machines currently used make the bell with the hot forming process and, for this purpose, they are equipped with at least one oven which heats the end of the pipe changing the end wall of the pipe to be shaped to a softened state.

The machine is also equipped with forming equipment which, by using a suitable mould, forms the heated end of the pipe into a bell shape.

A widespread application is the shaping of the end of the pipe by moulding with a spindle, also called a pad. The spindle, or pad, reproduces the internal shape of the bell to be formed. In order to form the end of the pipe in the shape of a bell, the pad is inserted inside the pipe at that end to be shaped.

The bell shaped on the mould is generally cooled inside the same forming equipment.

A seal is then inserted, often manually, in the annular cavity of the bell, to seal, in use, the connection between two successive pipes in the conduit.

There are also particular prior art automatic belling machines, which are frequently used in production lines for pipes made of PVC-U (commonly known as rigid, unplasticised PVC), that make an end bell with a seal already fitted inside.

These belling machines make the bell with a system which is commonly known in the literature as the "Rieber system".

The above-mentioned operations for forming the bell are quite complex, both with regard to the heating of the pipe—which for some materials must bring the pipe within particularly narrow temperature ranges, even by a single degree with reference both to its actual deformation as well as, lastly, the positioning inside the bell of the relative seal.

In order for all these complex operations to have a positive outcome and to provide as a result a product according to the requirements, a very large number of parameters must therefore be controlled and an equally large number of checks must be carried out.

Sometimes, regardless of compliance with the correct procedures by the operators, the complex series of operations, performed by the belling machine automatically, is not performed correctly with the result that, even though with a statistically negligible incidence, some pipes do not conform to the design specifications.

In order to limit the risks connected with the sale of belled pipes which do not conform, it is necessary to carry out a step of checking the quality of the products and, for this purpose, an operator is normally assigned who, as a result of the experience acquired, is able to assess, for each pipe made, the compliance with the requirements.

It is unnecessary to highlight the limits, in terms of compliance with quality, of a merely manual control.

According to the prior art, in particular with the aim of testing the correct positioning of the seal, each belled pipe is also subjected to a pressure test wherein, by applying a sort of cap to each respective end of the pipe, the pipe is placed under pressure in order to check the water tightness of the seal.

This latter type of control, as well as being rather laborious (resulting in a consequent significant slowing down of the entire production cycle) is difficult to automate since the pipes feeding out from the belling machine have a large range of lengths and it would therefore be complex to make a device which is able to adapt, ideally even quickly, to all the different lengths of pipe processed.

DISCLOSURE OF THE INVENTION

The aim of the invention is to provide a system for controlling the quality of processing pipes made of thermoplastic material which is free from the above-mentioned drawbacks.

A further aim of the invention is to provide a system for controlling the quality of processing pipes made of thermoplastic material which is able to effectively assess the quality of the pipes produced by a belling machine and at the same time allow high production speeds.

Yet another aim of the invention is to provide a system for controlling the quality of processing pipes made of thermoplastic material which can be easily adapted to control pipes of different lengths.

Yet another aim of the invention is to provide a system for controlling the quality of processing pipes made of thermoplastic material which is simple and inexpensive to make and practical to use.

These aims and others, which are more apparent in the description which follows, are achieved, in accordance with the invention, by a control system for the quality of processing of pipes made of thermoplastic material comprising the technical features described in one or more of the appended claims.

The technical features of the invention, with reference to the above-mentioned aims, are clearly described in the appended claims and its advantages are apparent from the description which follows.

DETAILED DESCRIPTION OF PREFERRED EMBODIMENTS OF THE INVENTION

As already mentioned above, the invention relates to a system for controlling the quality of processing pipes made of plastic material, and in particular those equipped with a bell at the relative end.

Parameters which can be considered for the purposes of a qualitative assessment of the conformity of plastic pipes equipped with bells at their end are as follows:

Colour: homogeneous in the case of a compliant product.

Morphology: the product has a series of parameters which determine the profile of the outer and inner wall (circularity of walls, thickness, size of seal housing, etc.).

Seal: it may be present inside the bell and, if present, must have a predetermined positioning.

Logos and markings: these can be present both as printing and as bas-relief.

Surface processes: these can be present such as in, for example, corrugated pipes.

Bell: its geometry must not present imprecisions.

The control system for the quality of processing pipes made of thermoplastic material according to the invention comprises a station for housing at least one or more pipes to be controlled.

Advantageously, according to a preferred but not exclusive embodiment of the invention, the housing station comprises seats for simultaneously housing four pipes to be controlled.

Depending on the diameter of the pipes to be controlled and therefore their overall dimensions, the housing station is made to house greater or smaller numbers of pipes to be controlled.

Figure 2:
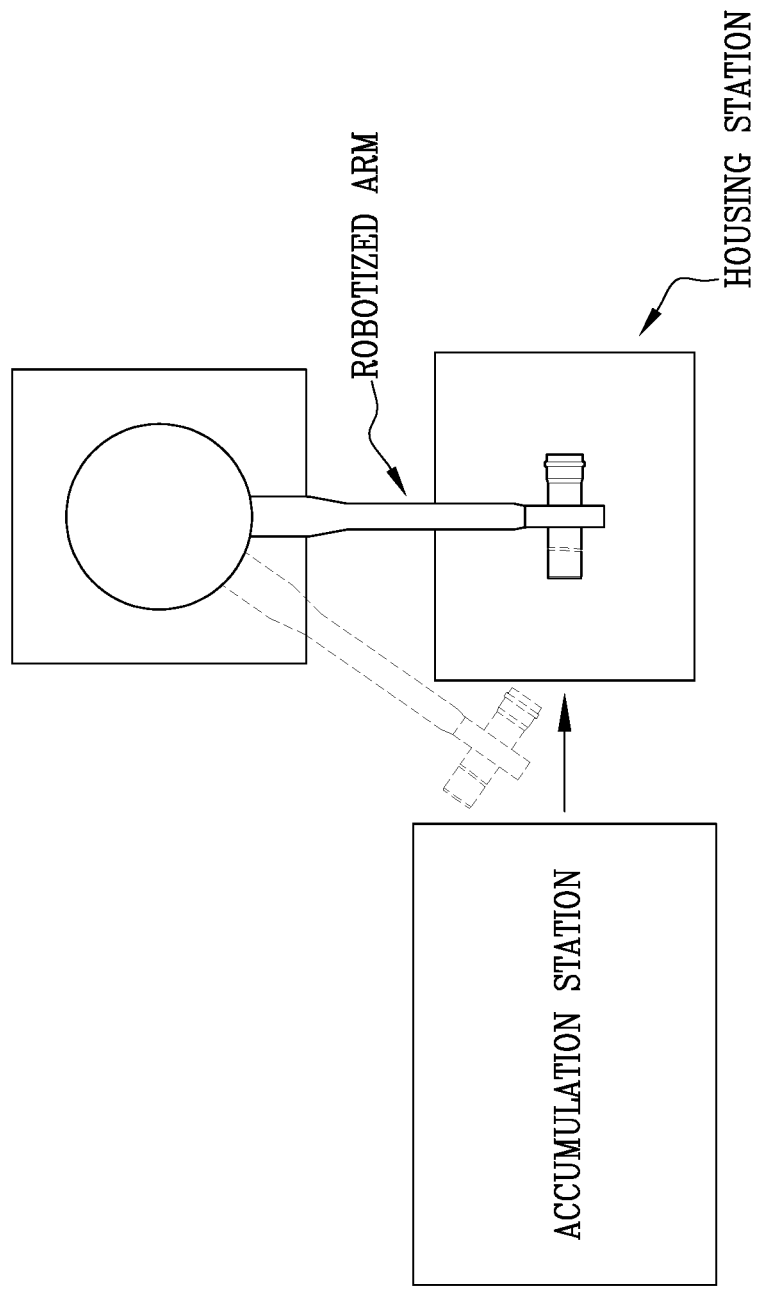
FIG. 2 is a further schematic drawing of the control system of FIG. 1.

The control system according to the invention advantageously comprises an automatic or robotized arm configured for picking up the pipes made of plastic material from a storage station and placing them in the above-mentioned housing station for subjecting them to the control. See FIG. 2.

A further automatic or robotized arm removes the pipes already controlled to send them to the subsequent production steps if they conform to the quality requirements or reject those pipes which, following the control performed, do not meet the quality requirements.

The two automatic or robotized arms described above can advantageously be implemented in a single automatic or robotized arm which is able to perform both the respective functions.

Figure 1:
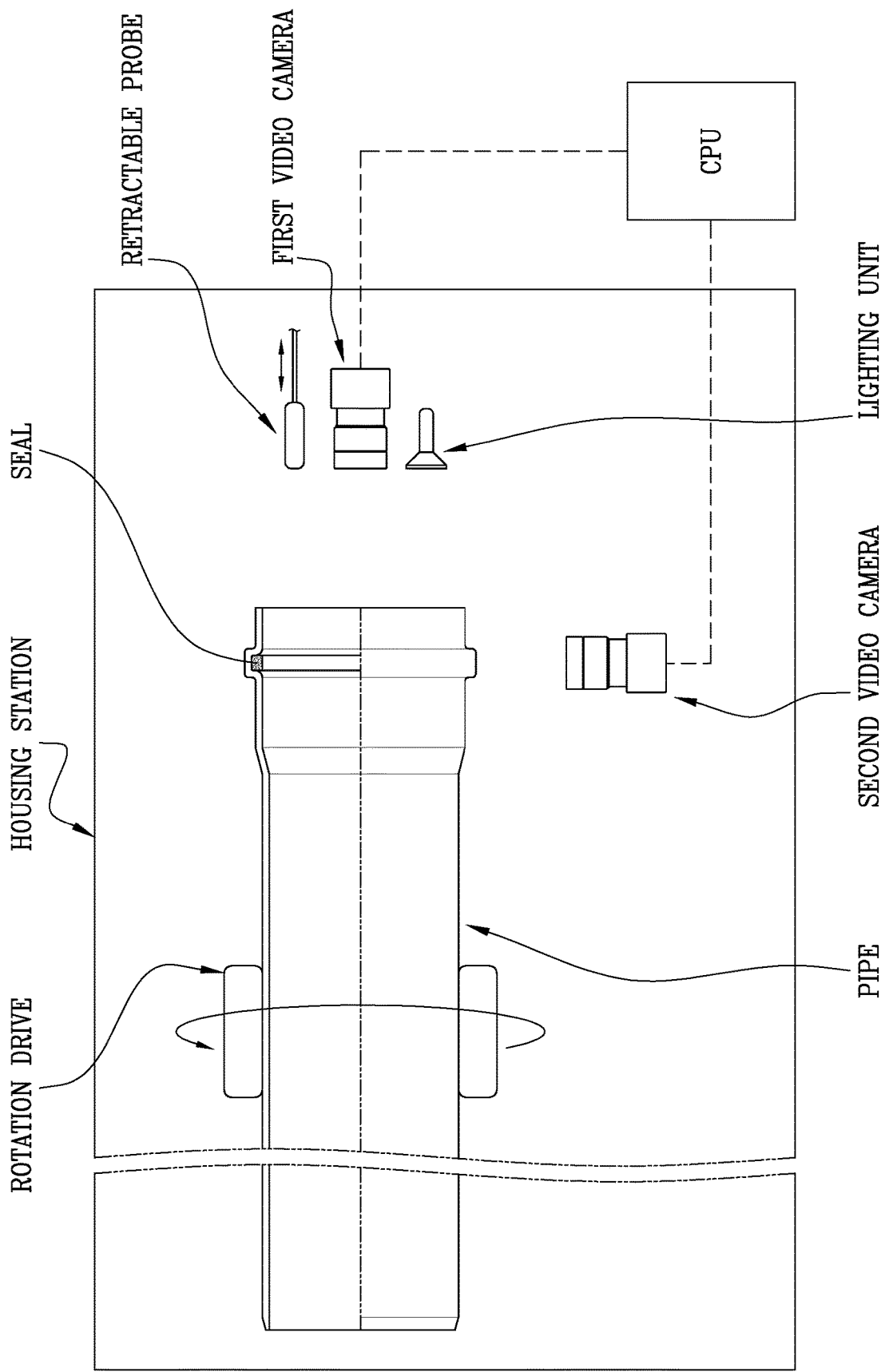
FIG. 1 is a schematic drawing of the present control system.

The quality control system according to the invention comprises, positioned at the above-mentioned station for housing the pipes, a first video camera configured for capturing images of a first front scene showing a first longitudinal end of the pipe to be controlled. See FIG. 1.

Advantageously, the first longitudinal end is that which has the bell and, when provided, a relative seal.

The quality control system according to the invention comprises, also positioned at the above-mentioned station for housing the pipes, a second video camera configured to capture images of a second lateral scene depicting the pipe in its longitudinal extension.

Since the above-mentioned second lateral scene captured by the second video camera clearly cannot with a single shot cover the entire lateral surface of the pipe, means are provided for rotation of the pipe to be controlled configured for rotating said pipe about a relative central axis to cause different portions of the lateral surface of the pipe to face in succession the second video camera.

In other words, the pipe subjected to control is rotated about its central axis in such a way as to allow the second video camera to capture, by means of two or more shots (or scans), the entire lateral surface of the pipe.

Alternative embodiments falling within the scope of the inventive concept comprise the presence of a greater number of video cameras, distributed angularly relative to the axis of the pipe in such a way as to provide, in their entirety, an overall panoramic view of the outer surface of the pipe thanks to which the use of the above-mentioned rotation means is no longer necessary.

The quality control system according to the invention also comprises a computerised processing unit configured for acquiring the images of the first and second scene and analysing them digitally to obtain information regarding the state of the pipe.

In particular, the computerised processing unit is configured to obtain from the images of the first front scene information such as the external diameter of the pipe at its first end (that is, the one where the bell has been made), its circularity, the presence of a seal positioned inside the pipe.

It is without doubt possible, from this first scene, to investigate the internal diameter of the pipe at its first end or also the regularity of its thickness or the correct positioning of the seal.

In particular, the computerised processing unit is configured for detecting from the images of the second lateral scene information such as the presence and extension of defects and/or irregularities on the lateral surface of the pipe.

Examples of such defects or irregularities are without doubt represented by cracks, fissures, whitenings or non-uniform marks of colour, logos shown incorrectly etc.

According to preferred embodiments, the control system according to the invention comprises a lighting unit configured to illuminate at least an inner part of the pipe to be controlled at its first end.

Correct lighting is, in effect, essential for an equally effective acquisition of the images by the video cameras.

As mentioned, with reference to the pipes made of thermoplastic material equipped with bells, to which the invention preferably relates, the quality control system aims to inspect the zone of the pipe in which the bell has been made and, where provided, the seal has been inserted.

Alternatively, if the seal is located in a subsequent step, the seat for housing the seal is controlled.

In addition to the possibility of assessing the conformity of the seat for housing the seal from the outside, that is to say, using the images obtained by the second lateral video camera, specific embodiments of the system comprise the presence of a retractable probe designed to be inserted inside the pipe for acquiring images of the inner surface of the pipe.

In that way, even though with a limited complication of the system, it is possible to obtain direct images of the seat for housing the seal and also, if necessary, the seal already inserted, in order to assess the correct positioning also in an axial direction.

For the purposes of this description, the expression "reference image" does not necessarily mean a real image but also a set of parameters which together define the above-mentioned reference image.

In other words, by way of example with reference to the verification of the presence of cracks or other surface irregularities, the above-mentioned reference image could without doubt consist of an actual, sample-type image captured by the system of a pipe without defects but also, simply, defined by the imposition of the absence of clear irregularities in the colouring of the pipe, if necessary with an extension in length/area greater than predetermined values.

Similarly, with reference for example to verifying the dimension of the circumference defined frontally of the outer wall of the pipe, the relative reference image may be both a real image of an actual, sample-type, pipe having the desired dimension, and simply a desired diameter value to be compared with that obtained by the system from the detected image of the pipe which is being controlled.

In yet other words, the processing of the images acquired may proceed both on the basis of a comparison with real reference images and through a digital analysis of the image which may provide, for example, particularly precise information on the dimensions of the pipe but also on the presence of surface defects or irregularities.

In use, a pipe made of plastic material is positioned at a housing station.

In this housing station there is a first video camera, oriented in such a way as to capture frontally a first longitudinal end of the pipe, advantageously the one in which the bell has been made, and a second video camera positioned, on the other hand, for capturing images of the lateral surface of the pipe.

At this point, the above-mentioned computerised processing unit acquires the images of the pipe taken by the above-mentioned first and second video cameras and analyses them digitally.

The digital analysis of the above-mentioned images provides, as a result, information relative to the status of the pipe, already described above, designed for assessing its processing quality.

The invention, as well as a system as described above, also relates to a method for controlling the quality of processing pipes made of thermoplastic material, and comprises a plurality of steps.

A first step is that of preparing a control system as described above.

A further step is to acquire images of a first front scene of a pipe by capturing a first longitudinal end of the pipe whilst another is to acquire images of a second lateral scene of the pipe by capturing a relative longitudinal extension.

The two steps of acquiring images just described are advantageously performed by the above-mentioned first and second video cameras.

The control method according to the invention comprises a step of processing the images of the first front scene to obtain from them at least one piece of information selected between the outer diameter of the pipe at its first end, and the presence of a seal located inside the pipe. The method comprises a further step of processing the images of the second scene to obtain from them information about the presence of defects and/or irregularities on the lateral surface of the pipe.

Both the above-mentioned steps of processing the images are performed by the computerised processing unit described above.

The control system and the method according to the invention achieve the preset aims and achieve significant advantages.

A first advantage is due to the fact that by means of the system and method it is possible to perform an effective control of the production quality of the pipes made of thermoplastic material without the use of human resources and thereby also overcoming the limits linked to the failure of this type of control.

Another advantage linked to the invention is due to the fact that thanks to the use of video cameras and the connected visual control basically of the end zone where the bell is positioned, it is possible to operate on many different lengths of pipes without this requiring particular modifications to the system.

The system according to the invention is also simple and inexpensive to make, requiring, in a relative basic form, substantially the presence of two video cameras and a computerised processing unit.

The invention claimed is:

1. A control system for controlling a quality of processing pipes made of thermoplastic material, comprising:
    a housing station for housing a pipe to be controlled;
    a first video camera configured for capturing images of a first front scene showing a first longitudinal end of said pipe;
    a second video camera configured for capturing images of a second lateral scene showing a longitudinal extension of said pipe;
    a computerized processing unit configured for acquiring said images of said first front scene and second lateral scene and analysing said images digitally to obtain information regarding a state of said pipe;
    wherein said computerized processing unit is configured:
        to obtain from said images of said first front scene information corresponding to an outer diameter of the pipe at said first longitudinal end and a presence of a seal located inside the pipe;
        compare said information corresponding to an outer diameter of the pipe with a reference image for verifying if the outer diameter of the pipe is within a desired dimension, the reference image configured as at least one chosen from a real image and a set of parameters which together define the reference image;
    a robotized arm configured at least for picking up said pipe from an accumulation station and for positioning said pipe in said housing station for controlling said pipe;
    a retractable probe configured to be inserted inside the pipe for capturing images of an inner surface of the pipe;
    wherein the second video camera is mounted to the retractable probe and configured to obtain direct images of a seat for housing the seal and/or the seal already inserted in the seat, to assess a correct positioning in an axial direction.

2. The control system according to claim 1, wherein said computerized processing unit is configured for detecting from said images of said second lateral scene information regarding a presence of at least one chosen from defects and irregularities on a lateral surface of the pipe.

3. The control system according to claim 1, and further comprising a lighting unit configured to illuminate at least an inner part of said pipe to be controlled at said first longitudinal end.

4. The control system according to claim 1, and further comprising a rotation drive configured for rotating said pipe about a relative central axis to cause different portions of the lateral surface of said pipe to face in succession said second video camera.

5. A control method for controlling a quality of processing pipes made of thermoplastic material, comprising the following steps:
- providing a control system comprising:
  - a housing station for housing a pipe to be controlled;
  - a first video camera configured for capturing images of a first front scene showing a first longitudinal end of said pipe;
  - a second video camera configured for capturing images of a second lateral scene showing a longitudinal extension of said pipe;
  - a retractable probe configured to be inserted inside the pipe for capturing images of an inner surface of the pipe;
  - wherein the second video camera is mounted to the retractable probe and configured to obtain direct images of a seat for housing the seal and/or the seal already inserted in the seat, to assess a correct positioning in an axial direction;
  - a computerized processing unit configured for acquiring said images of said first front scene and second lateral scene and analysing said images digitally to obtain information regarding a state of said pipe;
  - wherein said computerized processing unit is configured:
    - to obtain from said images of said first front scene information corresponding to an outer diameter of the pipe at said first longitudinal end and a presence of the seal located inside the pipe;
    - compare said information corresponding to an outer diameter of the pipe with a reference image for verifying if the outer diameter of the pipe is within a desired dimension, the reference image configured as at least one chosen from a real image and a set of parameters which together define the reference image;
- acquiring said images of said first front scene by capturing said first longitudinal end of said pipe,
- acquiring said images of said second lateral scene by capturing said longitudinal extension,
- processing, using said computerized unit, said images of said first front scene to obtain the information corresponding to the outer diameter of the pipe at said first longitudinal end, and the presence of said seal located inside the pipe, and comparing said information corresponding to the outer diameter of the pipe with the reference image for verifying if the outer diameter of the pipe is within the desired dimension,
- processing, using said computerized unit, said images of said second lateral scene to obtain about the presence of at least one chosen from defects and irregularities on a lateral surface of the pipe.

6. The control method according to claim 5, and further comprising a step of digitally analysing said images of said first front scene and second lateral scene.

7. The control method according to claim 5, and further comprising a step of comparing said images of said first front scene and second lateral scene with corresponding reference images.

* * * * *